Figure 1:
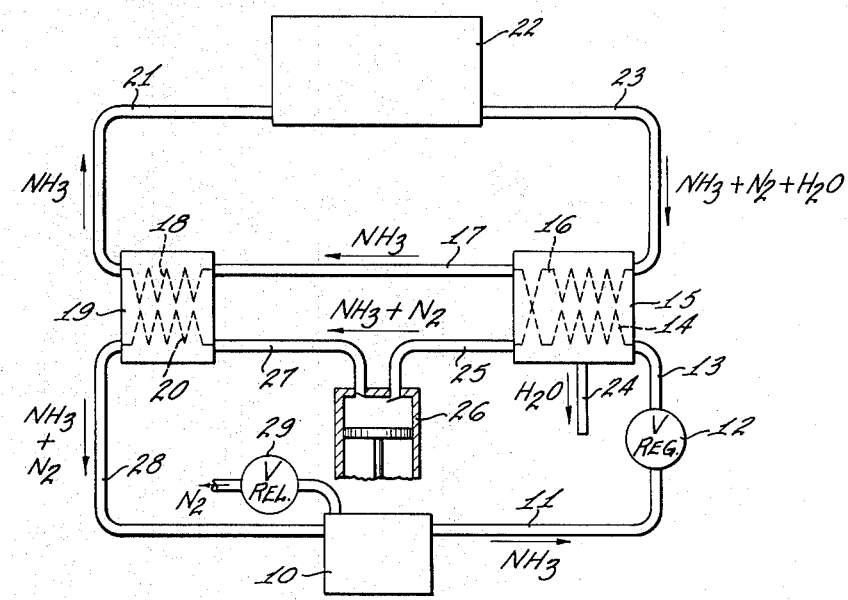

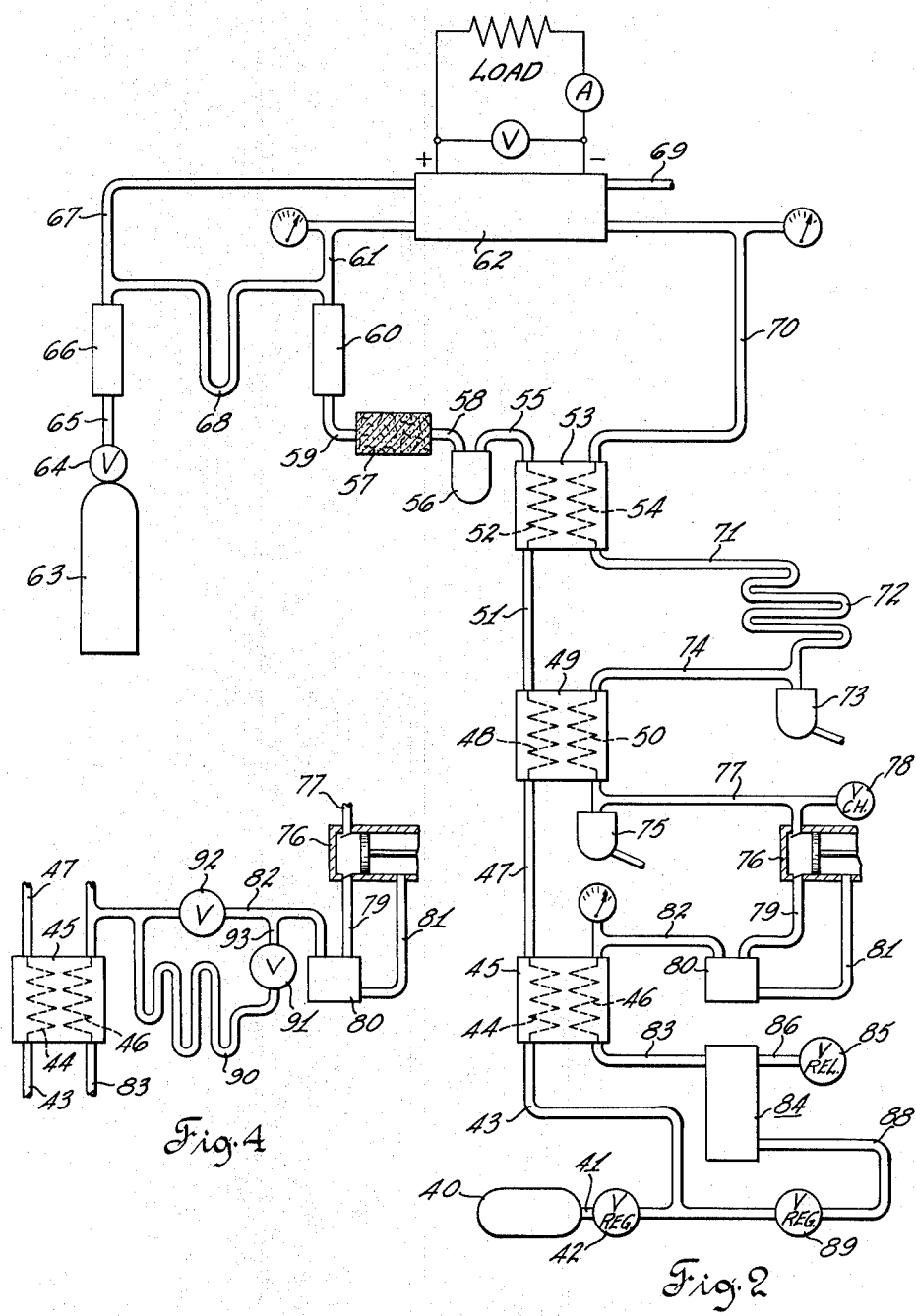

United States Patent Office 3,222,223
Patented Dec. 7, 1965

3,222,223
SYSTEM FOR FUEL CELLS
John L. Platner, Milwaukee, Wis., assignor to Allis-Chalmers Manufacturing Company, Milwaukee, Wis.
Filed Oct. 27, 1961, Ser. No. 148,205
12 Claims. (Cl. 136—86)

The present invention relates generally to electrochemical devices and more particularly to fuel cells in which an ammonia (ammoniacal) solution is employed as a fuel which, upon reaction with a suitable oxidant, produces useful electrical power.

In prior work relating to the use of ammonia as a fuel for fuel cells, several problems existed both in the supplying of ammonia to the cell and in the subsequent disposal of the exhaust gases.

Normally, ammonia is supplied as a liquid under a moderate pressure (130 p.s.i.a. at 70° F.) in tanks from which it may be drawn either as a liquid or as a vapor depending upon the wishes of the particular operator. When a large amount of ammonia, that is, enough to operate a single fuel cell module, is withdrawn from the tank at ambient temperature, the evaporation which occurs cools the remaining ammonia until the vapor pressure is reduced to the point where it is impossible to draw sufficient ammonia from the tank.

It was also found that the evaporation and cooling which reduced the vapor pressure also caused the ammonia which was entering the fuel cell module to be extremely cold (below 0° F.) which delayed the cells in achieving operating temperature and significantly reduced the rate of reaction in the cell. This in turn reduced the cell output directly. An indirect reduction in output occurred too. Because the cell ran colder, the water product formed by the reaction of the ammonia with the oxidant was not all removed. The output, thus, was reduced by partial flooding.

The present invention is predicated upon a design which overcomes all of the aforementioned problems.

Specifically, the design of the present invention provides a system which supplies sufficient ammonia vapor to the cells, supplies this vapor in a warmed condition, and provides means for removing nitrogen and water vapor from the cell exhaust whereupon the ammonia carried by the cell exhaust can be recovered for reuse.

Accordingly, one of the primary objects of the present invention is to provide a fuel cell system in which ammonia vapor is consistently supplied to a fuel cell module at a temperature and in sufficient quantity to enable the module to realize its operational potential.

Another object of the present invention is to provide a system for ammonia fueled fuel cell modules in which nitrogen and water vapor are completely removed from the cell whereupon flooding and/or smothering of the cell reaction by these products is avoided.

Still another object of the present invention is to provide a system for ammonia fueled fuel cells in which unspent ammonia being dissipated in the cell exhaust may be efficiently and effectively recovered and reused thereby significantly reducing the operating cost of the module.

A still further object of the present invention is to provide an improved system for use with fuel cell modules which exploits the thermodyanmic properties of the reaction products produced by the cells to provide optimum operating characteristics in the cell while realizing maximum utilization of the raw materials introduced thereinto.

These and still other objects of the present invention are fulfilled by the present invention in an unexpected manner as shall be readily discerned from the following detailed description of a selected embodiment of this invention, particularly when viewed in conjunction with the accompanying drawing.

Figure 3:
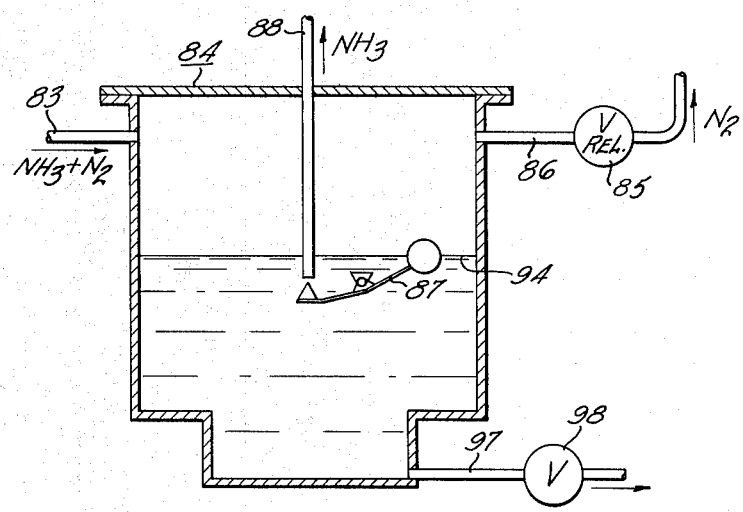

In the drawing:
FIG. 1 is a schematic of a system embodying the present invention;
FIG. 2 is a schematic of a more detailed system embodying the present invention;
FIG. 3 is an enlarged diagrammatic view of the receiver in FIG. 2; and
FIG. 4 is a schematic of a portion of the system of FIG. 2 showing a modification of the ammonia recovery sequence.

Referring to FIG. 1, liquid ammonia is fed under a pressure of about 150 p.s.i.a. from the tank 10 via conduit 11 through an expansion valve (regulator) 12 where its pressure is reduced to about 17 p.s.i.a. and its temperature to about —20° F. The cold liquid ammonia is then fed via conduit 13 to conduit 14 passing through first heat exchanger 15 where the ammonia extracts heat from the media flowing through conduit 16 as shall hereinafter be described. This heat partially converts the ammonia to a vapor state.

The partially vaporized ammonia then passes from the first heat exchanger 15 via conduit 17 into conduit 18 extending through second heat exchanger 19 where the ammonia extracts additional heat from the media flowing through conduit 20, also described hereinafter. The warm fully vaporized ammonia is then fed via conduit 21 to a fuel cell module 22 where it electrochemically reacts with a suitable oxidant supplied thereto (not shown in FIG. 1) to produce electricity and exhaust gases.

The exhaust gases of the fuel cells contain ammonia (which is deliberately supplied in excess of the amount required to sustain the reaction), nitrogen and water vapor at about 200° F. These gases pass from the module 22 via conduit 23 into conduit 16 of first heat exchanger 15 where they comprise the other flow media mentioned previously. Heat from the exhaust gases is extracted by the evaporating ammonia which passes adjacent thereto in conduit 14. The removal of heat from the stream of exhaust gases causes water vapor to condense out of the gas so that it can be suitably trapped and drained from the first heat exchanger 15, as with means 24. The ammonia and nitrogen in the exhaust gases substantially retain their gaseous state. The stream passing from conduit 16 of first heat exchanger 15 thus substantially constitutes gaseous ammonia and nitrogen which is then conducted via conduit 25 to a compressor 26.

In compressor 26 the exhaust stream is compressed from about 17 p.s.i.a. to about 150 p.s.i.a. The compressed gases are discharged from the compressor at a temperature of about 150° F. and are then passed via conduit 27 into conduit 20 in second heat exchanger 19 where they constitute the aforementioned media in the second flow therethrough. A heat exchange is effected between the media flowing through conduit 18 and conduit 20 whereupon the evaporated ammonia passing in conduit 18 is further warmed and the exhaust gas stream, passing therethrough in conduit 20, is further cooled. Upon further cooling in this manner, the ammonia in the exhaust gas stream passing through conduit 20 is condensed to a liquid while the nitrogen remains in a gaseous state. The flow of conduit 20 which contains liquified ammonia and gaseous nitrogen is then passed via conduit 28 into the ammonia storage tank 10 whereupon the liquified ammonia joins the liquid ammonia already in the tank for recycling. The gaseous nitrogen does not solubilize in the ammonia but instead collects in space provided in the tank above the liquid bath. The nitrogen gas is then periodically vented from the tank through a suitable relief valve 29.

The material from the tank re-enters the cycle through conduit 11 to regulator 12, etc. in the manner previously described.

The basic system in operaton therefore permits the drawing of liquid ammonia from the tank. This ammonia is then expanded and cooled by the regulator. The cooled, partially evaporated ammonia passes then through a pair of heat exchangers connected in series where it is warmed and vaporized. The warm ammonia vapor is then fed to the fuel cell module.

Upon leaving the fuel cell module, the exhaust stream passes back through one of the heat exchangers where, by a thermal transfer with the cooler ammonia also passing therethrough, water vapor is condensed from the stream and drained out of the system. The ammonia and nitrogen remaining in the exhaust stream are then passed through a compressor and, hence, to another heat exchanger where the ammonia is completely condensed. The condensed ammonia and the still gaseous nitrogen are then returned to the tank where the nitrogen collects above the liquid ammonia and is periodically vented therefrom. The ammonia is recycled.

A second system embodying the present invention, especially suited for larger installations, is shown in FIG. 2. In this practice, the modules are operated at approximately 17 p.s.i.a.; the temperature of the exhaust is 200° F.; the ambient temperature is 70° F.; the temperature differential in the heat exchangers is 13° F.; the temperature differential in the radiators, to be hereinafter described, is 20° F.; the rate of ammonia used by the fuel cell is 0.144 pounds per minute; the ammonia supplied is 0.288 pounds per minute per cell; and the pressure after the compressor is 150 p.s.i.a.

The rate of ammonia indicated represents the feed to twelve modules comprising fifty cells each and operating at 150 amps on three-fourths load, that is, at about 5.5 kilowatts.

The ammonia to start the cell and part of the ammonia to run the cell was supplied by the tank 40 from which it was drawn as a liquid at high pressure. This ammonia was passed via conduit 41 to expansion valve 42 where it was expanded to 17 p.s.i.a. The expanded gas from regulator 42 then passes via conduit 43 to conduit 44 in first heat exchanger 45 where the ammonia is cooled to −23° F. by the evaporation of a small part of the ammonia in response to the media flowing through conduit 46 to be hereinafter described. However, since all of the ammonia is not evaporated, the ammonia stream is passed, via conduit 47, into conduit 48 disposed through second heat exchanger 49 at −23° F. Here the ammonia is almost completely evaporated by heat released from cooling gases and condensing water vapor passing through conduit 50 as shall be hereinafter described in greater detail. Upon leaving second heat exchanger 49, the ammonia, at −23° F., passes via conduit 51 into conduit 52 disposed through a small heat exchanger 53 where it receives sufficient heat from the hot exhaust gases passing through conduit 54, as shall be described, to complete the evaporation of the ammonia and raise its temperature to ambient temperature (70° F.) or higher.

The ammonia vapor is next passed via conduit 55 through a conventional purification sequence comprising a liquid trap 56 and a filter 57 serially connected by conduit 58 to remove any contaminants, such as oil, dust or water, which might be present in the stream. The ammonia vapor is then directed via conduit 59 through a suitable flow meter 60 and, hence, via conduit 61 to the modules 62.

In the cells, half of the ammonia is used in the current producing reaction and half passes through as exhaust. The half of the ammonia that is used is replaced by 0.228 pounds of water per minute and 0.118 pounds of nitrogen per minute. These reaction products are formed on the fuel electrode and are removed from the cells in the fuel exhaust stream. Substantially complete removal of water and nitrogen from the cells is effected.

A suitable oxidant such, for example, as oxygen, air or the like, is fed to the modules independently of the ammonia stream from a supply tank 63 (oxygen tank shown as illustrative) through a suitable regulator valve 64 and conduit 65 into flow meter 66 and, hence, via conduit 67 to the modules 62. Oxidant flow meter 66 is connected conventionally with the ammonia flow meter 60 by a balancing manometer 68. The oxidant excess flow is directed through vent 69 into the atmosphere in the embodiment shown.

The hot fuel exhaust stream leaving the modules 62 is passed via conduit 70 to conduit 54 disposed through heat exchanger 53 when it is cooled slightly by a heat transfer with the incoming ammonia flow, previously described, in conduit 52. It is, of course, understood that the flows through all of the heat exchangers herein described are effected by two isolated streams which are thermally communicative only.

The exhaust stream as it leaves heat exchanger 53 is then passed via conduit 71 to and through a radiator 72 where it was cooled to 90° F. At this temperature most of the water in the stream was condensed therefrom. The condensate drained into a water trap 73 from which it was discarded.

The relatively dry gas passing from the radiator 72 is then passed via conduit 74 to conduit 50 disposed through heat exchanger 49 where it is cooled further by the heat transfer effecting the evaporation of the ammonia passing therethrough in conduit 48. Practically all of the water remaining in the exhaust stream is condensed here and the ammonia in the exhaust is cooled to about its saturation temperature. The condensate from the second heat exchanger 49 is caught in water trap 75 from which it is discarded as necessary.

The relatively water-free gas stream is next passed from heat exchanger 49 to compressor 76 via conduit 77. A check valve 78 is placed in conduit 77 to draw air into the system if the pressure in the line falls below atmospheric pressure. This thus provides a safety for the modules. It is not necessary in normal operation to use this safety. It is, however, useful during shutdown.

The exhaust gas stream is compressed by compressor 76 to 150 p.s.i.a. The partial pressure of ammonia in the mixture leaving compressor 76 via conduit 79 is 100 p.s.i.a. An oil trap 80 is placed in the line to catch and return, via conduit 81, such oil as may have entered the stream from compressor 76.

The exhaust stream from oil trap 80 is then passed via conduit 82 into conduit 46 extending through first heat exchanger 45 where the mixture of ammonia and nitrogen was cooled to −10° F. by the evaporating feed line ammonia in adjacent conduit 44. The partial pressure of the ammonia in the exhaust stream is thus reduced to 24 p.s.i. and almost all of it is condensed. The stream leaving the first heat exchanger 45 via conduit 83 thus consists of gaseous nitrogen, liquid ammonia, and a small amount of ammonia vapor (10.4 percent of the total gas by weight). The stream passes from conduit 83 into receiver 84.

The liquid ammonia falls to the bottom of receiver 84 and the gas which collects at the top is vented through a relief check valve 85 via conduit 86. Nine and one-half percent of the ammonia entering receiver 84 or 4.75 percent of the ammonia supplied to the cell is lost in this way. This loss can be reduced by raising the pressure, but this requires more power. One hundred and fifty p.s.i. was selected as a compromise between minimum ammonia loss and minimum power.

Referring momentarily to the enlarged schematic of receiver 84 which is shown in FIG. 3, a float valve 87 adjacent the bottom of receiver 84 allows the liquid ammonia to return to the system via conduit 88 yet excludes the gas. The return liquid in conduit 88 is expanded through a regulator 89 and mixes with the stream from the tank in conduit 43. Regulator 89 on the line from the receiver 84 is set for a higher pressure than regulator 42 on the line from tank 40 so that the system will draw preferentially from the receiver 84 and will use the tank 40 only for make-up, except on start-up. The nitrogen gas which collects above liquid level 94 is periodically vented by relief valve 85 through conduit 86. A suitable sediment discharge pipe 97 having a valve 98 therein is also provided. In some of the early tests with the modules, it was found that the operating pressure and the amount of excess ammonia were usually higher than assumed. Normal operating pressure was from 6 to 15 p.s.i.g. and ammonia supplied was three to ten times that required. When a great amount of excess ammonia is present in the exhaust, additional cooling capacity between the compressor 76 and the heat exchanger 45 will be useful. Suitable means, such as a radiator 90, may then be serially connected into the system, as shown in FIG. 4, where a radiator 90 is connected between the oil trap 80 and heat exchanger 45 and a bypass valve 91 adjacent the radiator is used to allow the additional cooling capacity to be employed as desired. When this is done, a valve 92 is poistioned in line 82 and closed while valve 91, positioned in conduit 93, is opened to direct flow through radiator 90.

In this latter instance, 13.4 percent of the exhaust gas was ammonia. 6.35 percent of the ammonia entering the receiver, or 4.25 percent of that supplied to the cell, was lost.

From the foregoing it becomes apparent that a system for ammonia fueled fuel cells has been described which fulfills all of the aforestated objectives to a remarkably unexpected extent. It is, of course, understood that such modifications and alterations of the system as may readily occur to one skilled in this art from the pages of this disclosure are intended within the spirit of the present invention especially as it is defined by the scope of the claims appended hereto.

Having now particularly described and ascertained the nature of my said invention and the manner in which it is to be performed, I declare that what I claim is:

1. A fuel cell system comprising: a fuel cell module adapted to receive and react ammonia and an oxidant to produce electric current and a heated exhaust product consisting essentially of unreacted ammonia, nitrogen and water; an oxidant supply operatively connected to said module and supplying oxidant thereto; an ammonia supply; a compressor; a first heat exchanger having first and second independent conduits passing therethrough, said first conduit being connected at one end in series with said module and receiving said heated exhaust product therefrom, said first conduit being connected at the other end thereof in series with said compressor, said second conduit being connected at one end thereof in series with said ammonia supply and being adapted for connection, at the other end thereof, to a second heat exchanger; a second heat exchanger having first and second independent fluid conduits passing therethrough, said first conduit of said second heat exchanger being connected at one end thereof to said other end of said second conduit of said first heat exchanger and at the other end thereof, to said module and supplying warm ammonia vapor thereto; said second conduit of said second heat exchanger being connected at one end thereof in series with said compressor and at the other end thereof to said ammonia tank; means operatively associated with said first heat exchanger for withdrawing condensed water therefrom; and means operatively associated with said ammonia tank for venting nitrogen therefrom.

2. A fuel cell system comprising: a fuel cell module adapted to receive and react ammonia and an oxidant to produce electric current and a heated exhaust product consisting essentially of unreacted ammonia, nitrogen and water; a compressor; a first heat exchanger having a first series connection therethrough connecting said module to said compressor, and a second series connection therethrough connecting a second heat exchanger and an ammonia supply; a second heat exchanger having a first series connection therethrough connecting said first heat exchanger and said module, and a second series connection therethrough connecting said compressor to an ammonia tank; and means connected to said first heat exchanger for trapping condensed water therefrom.

3. A fuel cell system comprising: a fuel cell module adapted to receive and react ammonia and an oxidant to produce electric current and a heated exhaust product consisting essentially of unreacted ammonia, nitrogen, and water; an ammonia supply; means interposed between said module and said ammonia supply for thermodynamically warming and vaporizing said ammonia while cooling and successively condensing said water and said ammonia from said exhaust product; means withdrawing said condensed water from said system; means withdrawing said uncondensed nitrogen from said system; and means passing said condensed ammonia to said ammonia supply.

4. A system according to claim 3 in which said first claimed means comprises at least two serially connected heat exchangers having independent conduits therethrough.

5. A system according to claim 4 in which said exhaust product stream passes countercurrently to said ammonia stream in said first heat exchanger.

6. A system according to claim 5 in which said serial flow of said exhaust product with said water removed passes through a compressor intermediate its ultimate and penultimate heat exchangers.

7. A fuel cell comprising: a fuel cell module adapted to reecive and react ammonia and an oxidant to produce electric current and a heated exhaust product consisting essentially of unreacted ammonia, nitrogen and water; an oxidant supply operatively connected to said module and supplying oxidant thereto; an ammonia supply; a compressor; a receiver; a first heat exchanger having first and second independent conduits passing therethrough, said first conduit being connected at one end in series with said module and directing warm vaporized ammonia thereto and being connected at the other end thereof with a second heat exchanger, said second conduit being connected at one end in series with said module and receiving said heated exhaust product therefrom, said second conduit being connected at the other end thereof with a second heat exchanger; a second heat exchanger having first and second independent conduits passing therethrough, said first conduit being connected at one end to said other end of said first conduit of said first heat exchanger and at the other end thereof to a third heat exchanger, said second conduit being connected at one end thereof to said other end of said second conduit of said first heat exchanger at the other end thereof in series with said compressor; a third heat exchanger having first and second independent conduits passing therethrough, said first conduit being connected at one end thereof to said other end of said first conduit of said second heat exchanger and being connected at the other end thereof in series with said ammonia supply, said second conduit being connected at one end thereof to said compressor and at the other end thereof to said receiver; said receiver receiving the flow from said second conduit and returning the liquified ammonia therein to said ammonia supply while exhausting the nitrogen contained there; and means operatively connected to said conduit intermediate said first and second heat exchanger to withdraw condensed water therefrom.

8. A fuel cell system comprising: a fuel cell module adapted to receive and react ammonia and an oxidant to produce electric current and a heated exhaust product consisting essentially of unreacted ammonia, nitrogen and water; a compressor; a first heat exchanger having a first series connection therethrough connecting a second heat exchanger and said module and a second series connection therethrough connecting said module to said compressor; and a second heat exchanger having a first series connection therethrough connecting said first heat exchanger and an ammonia supply, and a second series connection therethrough connecting said compressor to an ammonia tank; and means connected to said first heat exchanger for trapping condensed water therefrom.

9. A fuel cell system comprising: a fuel cell module adapted to receive and react ammonia and an oxidant to produce electric current and a heated exhaust product consisting essentially of unreacted ammonia, nitrogen and water; an ammonia supply; heat exchanger means interposed between said module and said ammonia supply for independently conducting said ammonia and said heated exhaust product therethrough to thermodynamically warm and vaporize said ammonia with the heat from heated exhaust product and cool and successively condense said water and said ammonia from said exhaust product; means withdrawing said condensed water from said system; means withdrawing said uncondensed nitrogen from said system; and means passing said condensed ammonia to said ammonia supply.

10. A system according to claim 9 in which said heat exchanger means comprises at least two serially connected heat exchangers having independent conduits therethrough.

11. A system according to claim 10 in which said exhaust product stream passes serially through said heat exchangers countercurrently to the serial flow of said ammonia stream therethrough.

12. A system according to claim 11 in which said serial flow of said exhaust product passes through a compressor intermediate said penultimate and ultimate heat exchangers.

References Cited by the Examiner

Status Report on Fuel Cells, June 1959, pages 88–89.

WINSTON A. DOUGLAS, *Primary Examiner.*

JOHN R. SPECK, *Examiner.*